US012406366B2

(12) United States Patent
Song et al.

(10) Patent No.: US 12,406,366 B2
(45) Date of Patent: *Sep. 2, 2025

(54) REAL-TIME WHOLE SLIDE PATHOLOGY IMAGE CELL COUNTING

(71) Applicant: NantOmics, LLC, Culver City, CA (US)

(72) Inventors: Bing Song, La Canada, CA (US); Liudmila A. Beziaeva, Culver City, CA (US); Shahrooz Rabizadeh, Los Angeles, CA (US)

(73) Assignee: NantOmics, LLC, Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/616,072

(22) Filed: Mar. 25, 2024

(65) Prior Publication Data

US 2024/0233124 A1 Jul. 11, 2024

Related U.S. Application Data

(63) Continuation of application No. 17/881,578, filed on Aug. 4, 2022, now Pat. No. 11,954,856, which is a (Continued)

(51) Int. Cl.
| | |
|---|---|
| *G06T 7/00* | (2017.01) |
| *G06T 7/11* | (2017.01) |
| *G06T 7/136* | (2017.01) |

(52) U.S. Cl.
CPC .............. *G06T 7/0012* (2013.01); *G06T 7/11* (2017.01); *G06T 7/136* (2017.01);
(Continued)

(58) Field of Classification Search
CPC ......... G06T 7/0012; G06T 7/11; G06T 7/136; G06T 2207/10056; G06T 2207/20041;
(Continued)

(56) References Cited

U.S. PATENT DOCUMENTS

| 10,755,406 B2 | 8/2020 | Barnes et al. |
| 11,443,426 B2 | 9/2022 | Song et al. |
| | (Continued) | |

FOREIGN PATENT DOCUMENTS

| JP | 2015-91220 A | 5/2015 |
| KR | 10-1700887 B1 | 2/2017 |

OTHER PUBLICATIONS

Raimondo et al. "Automated Evaluation of Her-2/neu Status in Breast Tissue From Fluorescent In Situ Hybridization Images." IEEE Transactions on Image Processing, vol. 14 No. 9, Sep. 2005, pp. 1288-1299 (Year: 2005).

(Continued)

*Primary Examiner* — Van D Huynh
(74) *Attorney, Agent, or Firm* — Maschoff Brennan; Andrew A. Noble

(57) ABSTRACT

Techniques are provided for determining a cell count within a whole slide pathology image. The image is segmented using a global threshold value to define a tissue area. A plurality of patches comprising the tissue area are selected. Stain intensity vectors are determined within the plurality of patches to generate a stain intensity image. The stain intensity image is iteratively segmented to generate a cell mask using a local threshold value that is and gradually reduced after each iteration. A chamfer distance transform is applied to the cell mask to generate a distance map. Cell seeds are determined on the distance map. Cell segments are determined using a watershed transformation, and a whole cell count is calculated for the plurality of patches based on the cell segments. A client device may be configured for real-time cell counting based on the whole cell count.

20 Claims, 10 Drawing Sheets

Related U.S. Application Data continuation of application No. 16/957,036, filed as application No. PCT/US2019/013700 on Jan. 15, 2019, now Pat. No. 11,443,426.

(60) Provisional application No. 62/618,979, filed on Jan. 18, 2018.

(52) U.S. Cl.
CPC .............. *G06T 2207/10056* (2013.01); *G06T 2207/20041* (2013.01); *G06T 2207/20104* (2013.01); *G06T 2207/20152* (2013.01); *G06T 2207/30024* (2013.01); *G06T 2207/30096* (2013.01); *G06T 2207/30242* (2013.01)

(58) Field of Classification Search
CPC . G06T 2207/20104; G06T 2207/20152; G06T 2207/30024; G06T 2207/30096; G06T 2207/30242; G06T 7/187
See application file for complete search history.

(56) References Cited

U.S. PATENT DOCUMENTS

| | | | |
|---|---|---|---|
| 11,954,856 B2 | 4/2024 | Song et al. | |
| 2006/0127880 A1* | 6/2006 | Harris | G06V 20/69 |
| | | | 382/128 |
| 2009/0238457 A1* | 9/2009 | Rittscher | G06V 20/695 |
| | | | 382/173 |
| 2009/0262993 A1 | 10/2009 | Kotsianti et al. | |
| 2013/0188857 A1 | 7/2013 | Yoshihara et al. | |
| 2013/0288249 A1* | 10/2013 | Gullberg | C12Q 1/68 |
| | | | 435/6.11 |
| 2017/0213344 A1 | 7/2017 | Hong et al. | |
| 2017/0337695 A1* | 11/2017 | Sarkar | G06V 20/69 |
| 2018/0012062 A1* | 1/2018 | Zahniser | G06V 20/698 |
| 2018/0240239 A1* | 8/2018 | Wang | G06T 7/194 |
| 2019/0095679 A1 | 3/2019 | Aragaki | |
| 2019/0147215 A1* | 5/2019 | Al-Kofahi | G06T 7/11 |
| | | | 382/133 |
| 2019/0392578 A1* | 12/2019 | Chukka | G06V 20/698 |
| 2021/0192737 A1* | 6/2021 | Zhou | G06T 7/285 |
| 2022/0292277 A9* | 9/2022 | Bredno | G06V 10/25 |

OTHER PUBLICATIONS

Chourasiya et al., "Automatic Red Blood Cell Counting using Watershed Segmentation," International Journal of Computer Science and Information Technologies, vol. 5, 2014, pp. 4834-4838.

International Search Report and Written Opinion issued in International Application No. PCT/US2019/013700 dated May 8, 2019, 11 pages.

International Preliminary Report on Patentability issued in International Application No. PCT/US2019/013700 dated Jul. 30, 2020, 7 pages.

Non-Final Office Action dated Oct. 5, 2023 for U.S. Appl. No. 17/881,578, 13 pages.

* cited by examiner

REAL-TIME WHOLE SLIDE PATHOLOGY IMAGE CELL COUNTING

CROSS REFERENCE TO RELATED APPLICATIONS

This application is a continuation of U.S. application Ser. No. 17/881,578, filed on Aug. 4, 2022, which is a continuation of U.S. application Ser. No. 16/957,036, filed on Jun. 22, 2020, which is a U.S. national phase of International Application No. PCT/US2019/013700, filed on Jan. 15, 2019, which claims the benefit of U.S. Provisional Application Ser. No. 62/618,979, filed on Jan. 18, 2018. The entire contents of these applications are hereby incorporated herein by reference.

TECHNICAL FIELD

This disclosure relates generally to imaging for pathology applications, and more specifically to whole slide pathology image cell counting techniques.

BACKGROUND

Whole slide imaging (WSI), which refers to the scanning of conventional glass slides to produce digital slides, has supported the development of next-generation sequencing (NGS). Whole slide imaging is used by pathologists for diagnostic, educational, and research purposes. However, barriers to more widespread adoption of whole slide imaging include an inability to handle certain high-throughput activities, such as determining a cell count for selected patches of a whole slide image. Whole slide imaging frames are large enough to contain several million cells, and pathologists often need to know how many tissue slides to cut, e.g., to satisfy next-generation sequencing minimum cell count requirements. Currently, most pathologists count the cells for a patch that contains several hundred or thousand cells using cell counting programs on local computers. However, modern cancer diagnostics, such as NantOmics® Genomic Proteomic and Spectrometry (GPS) cancer diagnostics, require counting one million or more cells faster than current local computer-based methods. Thus, there remains a need for an effective real-time cell counting solution that can determine how many cells (e.g., tumor or cancer cells) are within a selected area of a whole slide pathology image.

SUMMARY

Systems, methods, and articles of manufacture related to real-time cell counting within a whole slide pathology image are described herein. The various embodiments use whole slide stain (color) separation, local drain cell segmentation, and watershed transform methods for patch-based cell counting, and are based on a client-server architecture that addresses the drawbacks of counting large numbers of cells with current local computer-based cell counting programs. As such, for the first time, a real-time cell count can be determined for a selected region of interest that contains one million or more cells within a whole slide pathology image based on improved computational methods and design of client-server architecture.

In one embodiment, a whole slide pathology image is obtained and segmented using a global thresholding filter. The global thresholding filter determines if one or more features of the image satisfy a global threshold value. The one or more features that satisfy the global threshold value define a tissue area. The global thresholding value may comprise a minimum threshold between an Otsu filter and a Yen filter. A plurality of patches comprising the tissue area are selected. Stain intensity vectors are determined within the plurality of patches to generate a stain intensity image. The stain intensity image is iteratively segmented using the global thresholding filter to generate a cell mask, where the global thresholding filter determines if one or more features of the stain intensity image satisfy a local threshold value that is initially less than the global threshold value and gradually reduced after each iteration until a size of each mask blob within the cell mask is related to a selected cell size in a final iteration. The selected cell size may be one of a known human or animal cell size, e.g., between 5 to 20 microns. A chamfer distance transform is applied to the cell mask to generate a distance map. A maximum height (brightness) marker ("h_maxima") is determined on the distance map and cell seeds are determined in the distance map using the h_maxima marker. Cell segments are determined within the plurality of patches using a watershed transformation, where inputs to the watershed transformation comprise the distance map with the h_maxima marker and the cell seeds. A whole cell count is calculated for the plurality of patches based on the cell segments, and a client device is configured for real-time cell counting based on the whole cell count.

In some embodiments, a mean filter is used to segment the whole slide pathology image when the tissue area is determined to be less than a threshold amount of the image. The threshold amount may be less than 10% of the whole slide pathology image.

In some embodiments, the plurality of patches is randomly selected, and may comprise at least 100 patches.

In some embodiments, generating the stain intensity vectors may comprise converting each patch of the plurality of patches from RGB space to optical density space, removing pixels from each patch of the plurality of patches that do not have stain or have less than a threshold amount of stain, concatenating remaining pixels from the plurality of patches to form a matrix, and determining a stain plane by computing a singular-value decomposition of the matrix. The optical density may comprise a logarithm of RGB (color) density, and the optical density space and the stain plane may be two-dimensional spaces.

In some embodiments, iteratively segmenting the stain intensity image may comprise using a local mean filter having a block size equal to the selected cell size.

In some embodiments, a gaussian smoothing filter may be used to normalize the distance map.

In one embodiment, an indication of a selected region of interest within the whole slide pathology image is received, wherein the selected region of interest comprises at least a portion of one or more patches of the plurality of patches. A cell count is determined for the selected region of interest based on the whole cell count, and the cell count is displayed for the selected region of interest to a user via a display device. The indication of the selected region of interest may be received from a user via a client device that comprises at least one of a cellular smartphone, kiosk, personal data assistant, tablet, robot, vehicle, or web camera. The selected region of interest may be a closed curve that comprises suspected tumor or cancerous cells.

In some embodiments, for each patch on a boundary of the whole slide pathology image, a percentage of a patch covered by the closed curve may be determined, and a cell count may be calculated for the patch as a function of the percentage.

Various objects, features, aspects and advantages of the inventive subject matter will become more apparent from the following specification, along with the accompanying drawings in which like numerals represent like components.

Figure 1:
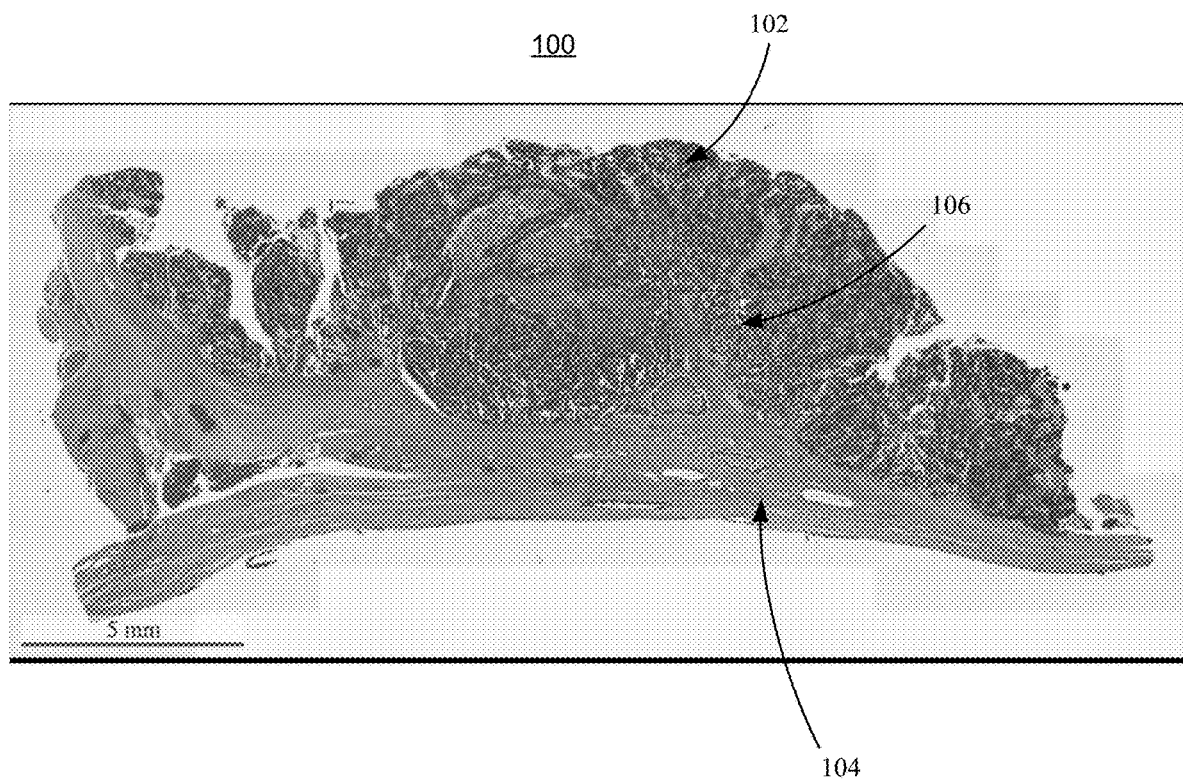
FIG. 1 illustrates a graphical representation of a whole slide pathology image analyzed in accordance with an embodiment of the present invention.

While the invention is described with reference to the above drawings, the drawings are intended to be illustrative, and other embodiments are consistent with the spirit, and within the scope, of the invention.

DETAILED DESCRIPTION

The various embodiments now will be described more fully hereinafter with reference to the accompanying drawings, which form a part hereof, and which show, by way of illustration, specific examples of practicing the embodiments. This specification may, however, be embodied in many different forms and should not be construed as being limited to the embodiments set forth herein; rather, these embodiments are provided so that this specification will be thorough and complete, and will fully convey the scope of the invention to those skilled in the art. Among other things, this specification may be embodied as methods or devices. Accordingly, any of the various embodiments herein may take the form of an entirely hardware embodiment, an entirely software embodiment or an embodiment combining software and hardware aspects. The following specification is, therefore, not to be taken in a limiting sense.

Throughout the specification and claims, the following terms take the meanings explicitly associated herein, unless the context clearly dictates otherwise:

The phrase "in one embodiment" as used herein does not necessarily refer to the same embodiment, though it may. Thus, as described below, various embodiments of the invention may be readily combined, without departing from the scope or spirit of the invention.

As used herein, the term "or" is an inclusive "or" operator, and is equivalent to the term "and/or," unless the context clearly dictates otherwise.

The term "based on" is not exclusive and allows for being based on additional factors not described, unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices.

In addition, throughout the specification, the meaning of "a", "an", and "the" includes plural references, and the meaning of "in" includes "in" and "on".

Although some of the various embodiments presented herein constitute a single combination of inventive elements, it should be appreciated that the inventive subject matter is considered to include all possible combinations of the disclosed elements. As such, if one embodiment comprises elements A, B, and C, and another embodiment comprises elements B and D, then the inventive subject matter is also considered to include other remaining combinations of A, B, C, or D, even if not explicitly discussed herein. Further, the transitional term "comprising" means to have as parts or members, or to be those parts or members. As used herein, the transitional term "comprising" is inclusive or open-ended and does not exclude additional, unrecited elements or method steps.

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable medium storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

As used in the description herein and throughout the claims that follow, when a system, engine, server, device, module, or other computing element is described as configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer should be read to include any suitable combination of computing devices, including servers, interfaces, systems, databases, agents, peers, engines, controllers, modules, or other types of computing devices operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, etc.). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of network.

The focus of the disclosed inventive subject matter is to enable construction or configuration of a computing device to operate on vast quantities of digital data, beyond the capabilities of a human for purposes including real-time cell counting within a whole slide pathology image.

One should appreciate that the disclosed techniques provide many advantageous technical effects including improving the scope, accuracy, compactness, efficiency, and speed of real-time cell counting within a whole slide pathology image. It should also be appreciated that the following specification is not intended as an extensive overview, and as such, concepts may be simplified in the interests of clarity and brevity.

FIG. 1 illustrates a graphical representation of a whole slide pathology image analyzed in accordance with an embodiment of the present invention. A whole slide pathology image 100 may be generated when a pathologist wishes to look at a biopsy of a suspected cancer or make other medical diagnoses. Typically, a whole slide pathology image such as image 100 may include more than two million cells. Thus, a hematoxylin and eosin stain ("H&E stain" or "HE stain"), may be used for distinguishing the various structures within the whole slide pathology image. As shown, hematoxylin is a dark blue or violet stain that binds to various tissue/cellular regions 102 (i.e., basophilic substances such as DNA and RNA), while eosin is a red or pink stain that binds to acidophilic substances including cytoplasmic filaments in muscle cells, intracellular membranes, and extracellular fibers such as, for example, plasma region 104. In an embodiment, a patch 106 of whole slide pathology image 100 may be selected for medical diagnosis and study based on the various distinguished tissue areas. For example, one or more patches of whole slide pathology image 100 may be selected to cut tissue slides that satisfy NGS minimum cell count requirements.

Figure 2:
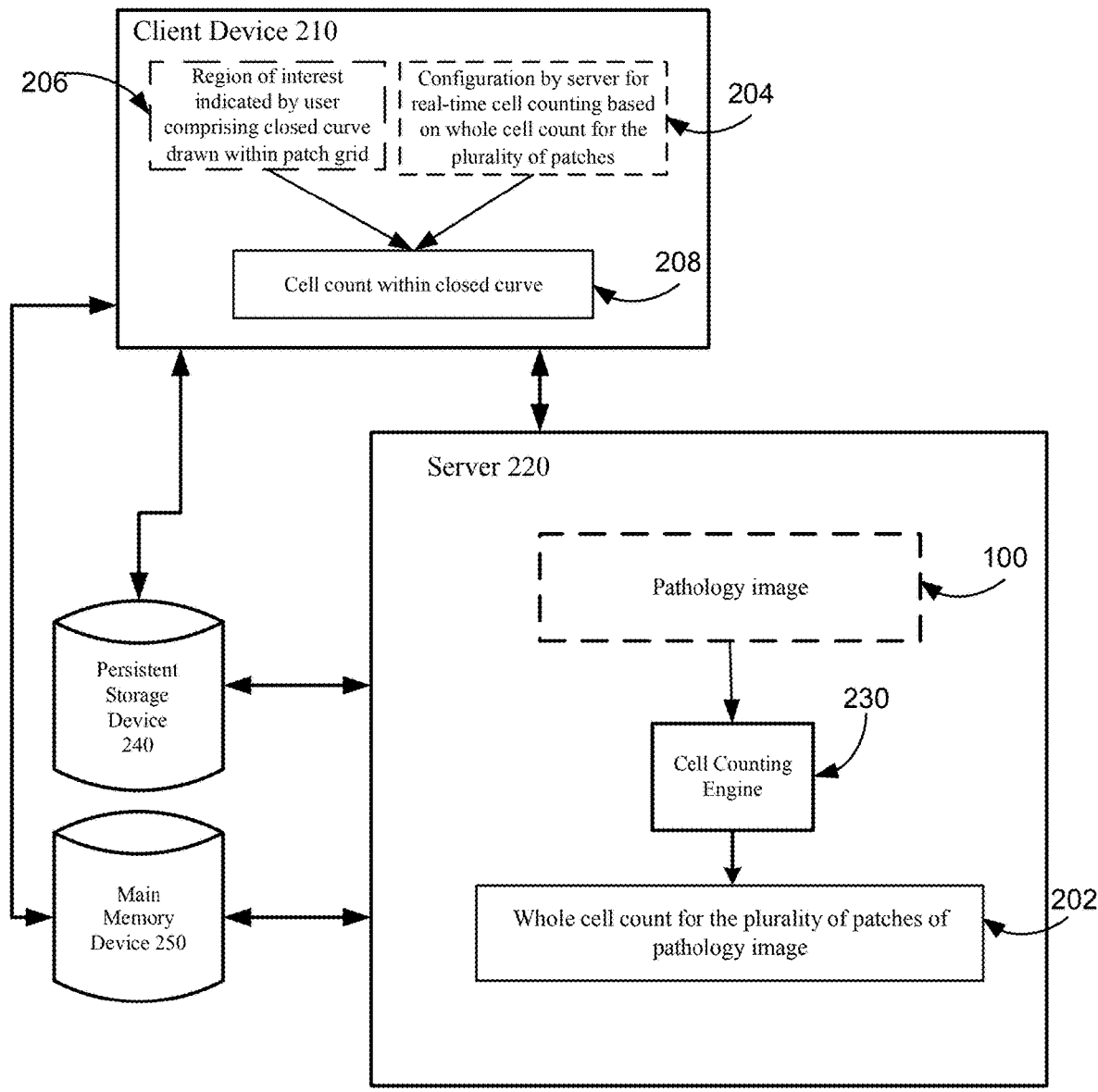
FIG. 2 illustrates a block diagram of a system for determining a cell count for a region of interest within a whole slide pathology image in accordance with an embodiment.

FIG. 2 illustrates a block diagram of a system for determining a cell count for a region of interest within a whole slide pathology image in accordance with an embodiment. In block diagram 200, elements for determining a cell count for a region of interest within a whole slide pathology image include client device 210, server 220, cell counting engine 230, persistent storage device 240, and main memory device 250. In an embodiment, server 220 may be configured to obtain a whole slide pathology image such as, for example, image 100, which may be stained, e.g., with a hematoxylin and eosin stain (H&E stain or HE stain), for various areas of the image to be discernable for medical diagnosis and study. For example, image 100 may be obtained from either one or both of persistent storage device 240 and main memory device 250. In an embodiment, server 220 may comprise cell counting engine 230, which may be configured to receive image 100 and execute one or more of the methods described in detail below to determine a whole cell count 202 for a plurality of selected patches within image 100. Client device 210 may then be configured by server 220 for real-time cell counting based on the whole cell count for the plurality of patches 204. For example, when a region of interest indicated by a user is received 206, e.g., a closed curve drawn within a patch grid overlay of image 100, a cell count is determined for the selected region within the closed curve 208. The cell count may then be displayed to the user via a display device or stored, for example, in either one or both of persistent storage device 240 and main memory device 250.

It should be noted that the elements in FIG. 2, and the various functions attributed to each of the elements, while exemplary, are described as such solely for the purposes of case of understanding. One skilled in the art will appreciate that one or more of the functions ascribed to the various elements may be performed by any one of the other elements, and/or by an element (not shown) configured to perform a combination of the various functions. Therefore, it should be noted that any language directed to a client device 210, a server 220, a cell counting engine 230, a persistent storage device 240 and a main memory device 250 should be read to include any suitable combination of computing devices, including servers, interfaces, systems, databases, agents, peers, engines, controllers, modules, or other types of computing devices operating individually or collectively to perform the functions ascribed to the various elements. Further, one skilled in the art will appreciate that one or more of the functions of the system of FIG. 2 described herein may be performed within the context of a client-server relationship, such as by one or more servers, one or more client devices (e.g., one or more user devices) and/or by a combination of one or more servers and client devices.

Figure 3:
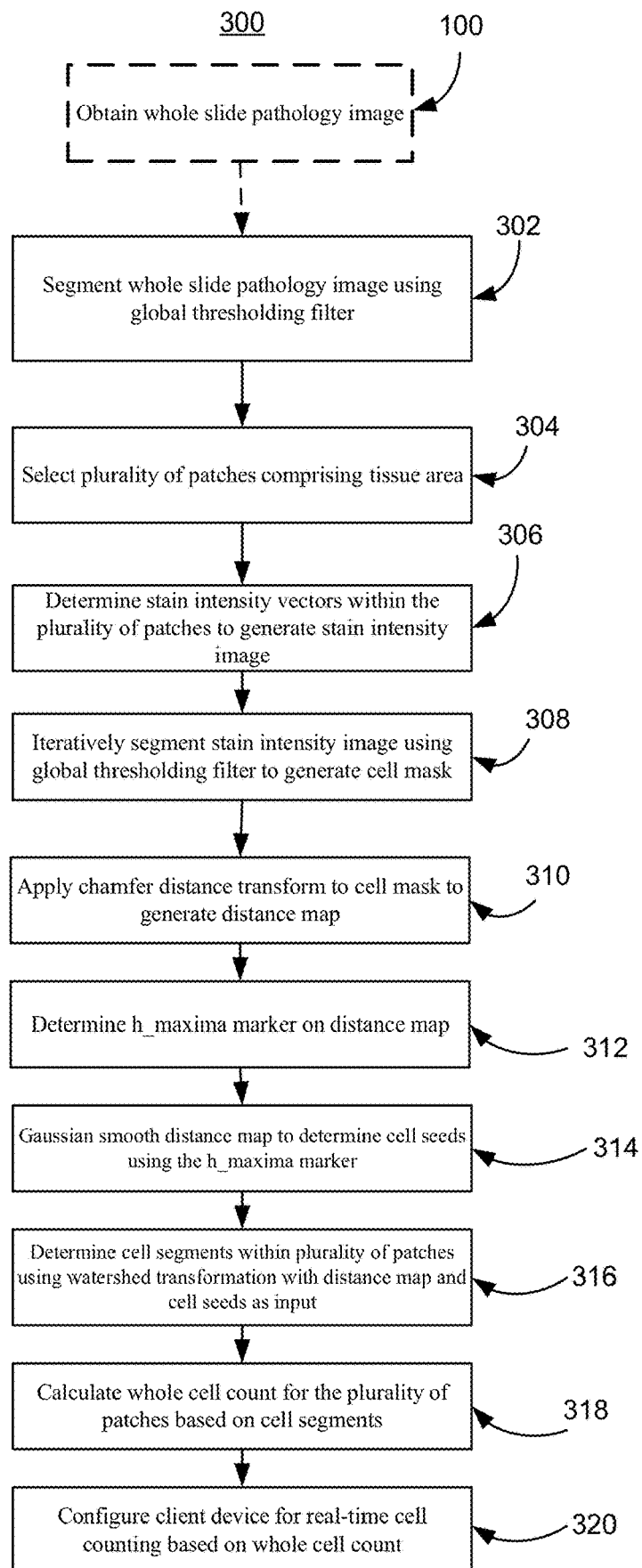
FIG. 3 illustrates a flow diagram of example operations for determining a cell count for a region of interest within a whole slide pathology image in accordance with an embodiment.

FIG. 3 illustrates a flow diagram of example operations for determining a cell count for a region of interest within a whole slide pathology image in accordance with an embodiment. At step 302, a whole slide pathology image 100 is obtained and segmented using a global thresholding filter. The global thresholding filter determines if one or more features of the image satisfy a global (first) threshold value, where the one or more features that satisfy the global threshold value define a tissue area. In an embodiment, the global thresholding filter may be based on the following algorithm:

```
Input: hematoxylin stain matrix hx
global_threshold = min(otsu(hx), yen(hx))
if global_threshold > max_t
    global_threshold = max_t + 0.5*(global_threshold − max_t)
``` where the global threshold value is generally defined as a minimum between Otsu filter and Yen filter thresholds. If the global threshold value is greater than a maximum threshold value, the global threshold value is defined by a sum of the maximum threshold value and one half of the difference between the global threshold value and the maximum threshold value.

Figure 4:
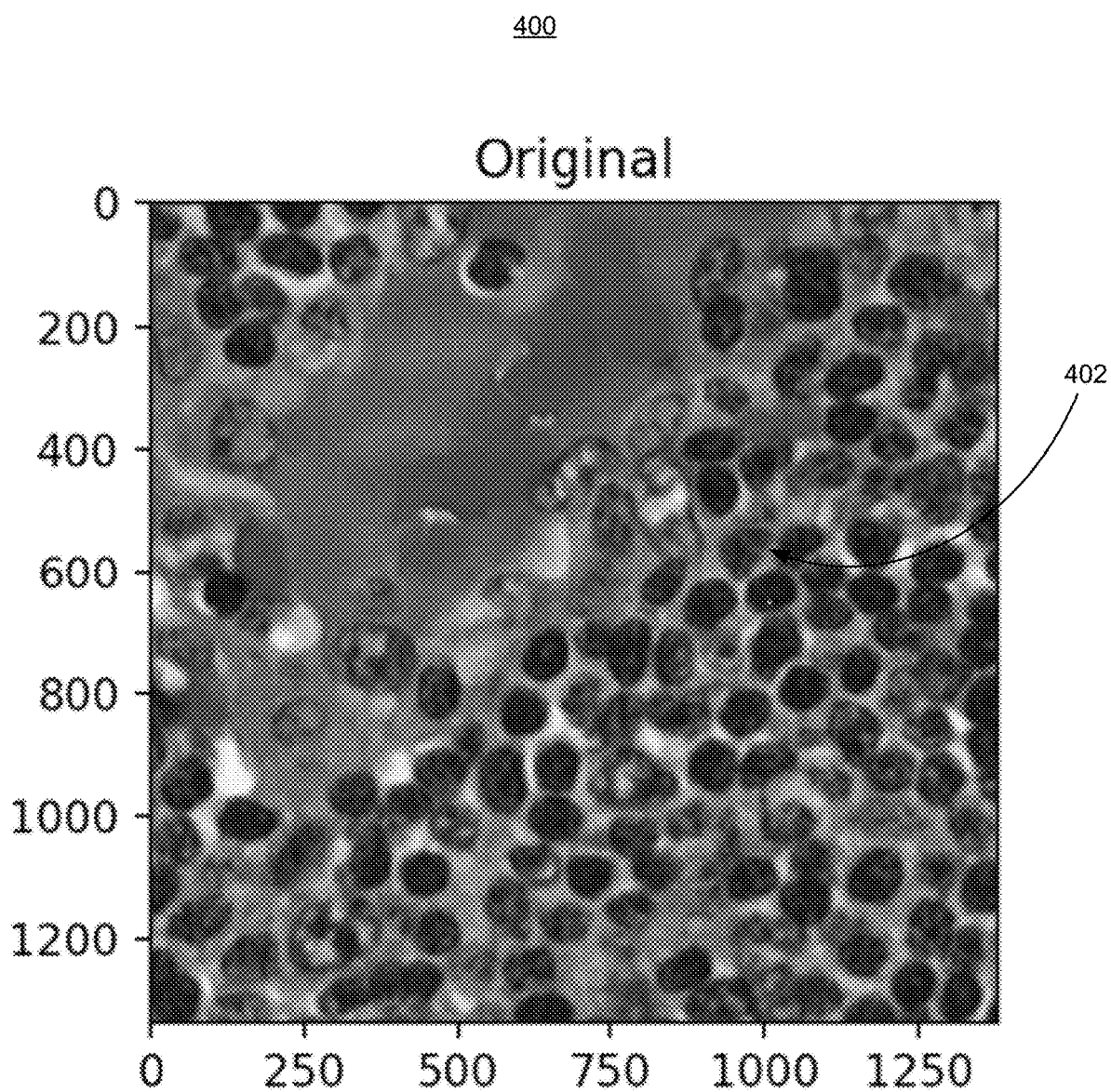
FIG. 4 illustrates a graphical representation of a patch of a whole slide pathology image in accordance with an embodiment.

At step 304, a plurality of patches comprising the tissue area are selected. For example, the whole slide pathology image may include at least two million cells, and the plurality of patches may be selected for medical diagnosis and study based on, e.g., suspected tumor or cancerous cells. In an embodiment, hundreds of patches may be selected from the tissue area randomly and, depending on the whole slide image resolution, each patch may contain several hundred cells. FIG. 4 illustrates a graphical representation of a patch of the whole slide pathology image in accordance with an embodiment. For example, original patch 400 (which may be, for example, patch 106 in FIG. 1) illustrates an unprocessed selection of a whole slide pathology image that includes tissue areas 402 designated by the dark blue or violet stain.

Stain intensity vectors are determined within the plurality of patches to generate a stain intensity image at step 306. For example, determining the stain intensity vectors may include determining an optical density, e.g., a logarithm of red-green-blue (RGB) density, of each one of the plurality of patches, thereby defining an optical space, and determining a stain plane in the optical density space, which may be a two-dimensional space. In one embodiment, determining the stain intensity vectors comprises, for each patch, converting the patch from RGB space to optical density space, and removing the pixels that do not have stain or have less than a threshold amount of stain. All of the remaining high-quality pixels from the plurality of patches are then concatenated to form a [N, 3] two-dimensional matrix, and the two-dimensional stain (hematoxylin and eosin) plane is determined by computing a singular-value decomposition (SVD) of the matrix. Stain vectors for hematoxylin and eosin may then be computed using various known procedures such as, for example, the procedures described by Marc Macenko, et. al. in the paper titled: "A Method for Normalizing Histology Slides for Quantitative Analysis".

Figure 5:
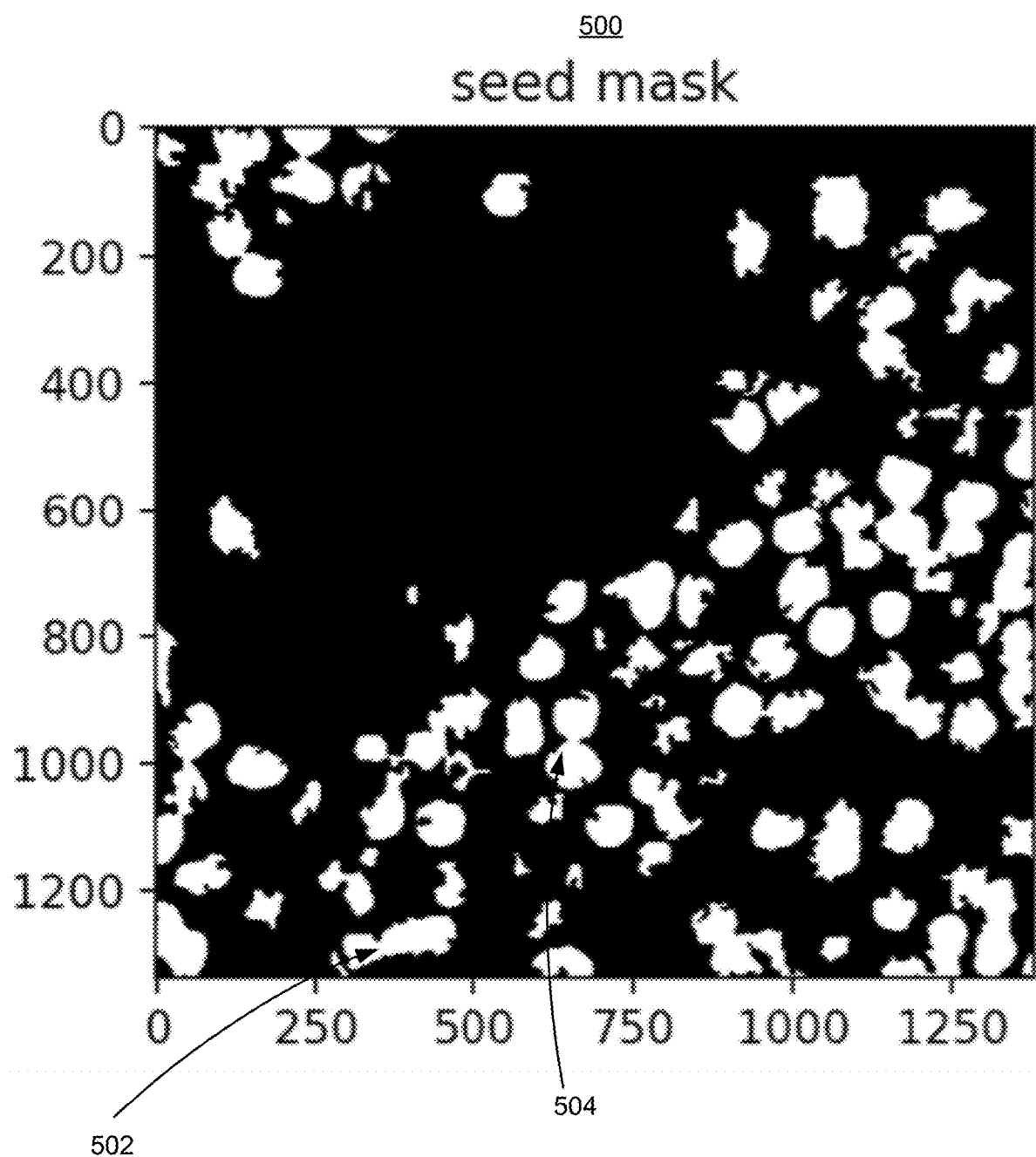
FIG. 5 illustrates a graphical representation of a seed mask of the whole slide pathology image in accordance with an embodiment.

At step 308, the stain intensity image is iteratively segmented using the global thresholding filter to generate a cell mask. FIG. 5 illustrates a graphical representation of a cell mask of the whole slide pathology image in accordance with an embodiment. In an embodiment, the global thresholding filter is used to determine if one or more features of the stain intensity image satisfy a local (second) threshold value that is initially less than the global (first) threshold value and gradually reduced after each iteration until a size of each mask blob within the cell mask is related to a selected cell size in a final iteration. In an embodiment, the selected cell size may be one of a known human or animal cell size, e.g., between 5 to 20 microns, or another cell size, as necessary. As illustrated in cell mask 500, more potential cells 502 and 504 can be captured after each iteration, as opposed to a scenario where individual cells are not discovered due to, for example, the threshold being reduced too rapidly. In an embodiment, iteratively reducing the local threshold is based on the following algorithm:

```
Input: hematoxylin stain matrix hx
Output: threshold matrix thres_m
max_area = 4*cell_size*cell_size
initialize thres_m with global_threshold
for curr_t in range(global_threshold, min_thres-1, -delta)
    mask = hx < curr_t
    find connected objects in mask
    for o in objects:
        count pixels for each object
        if pixel_count > max_area:
            thres_m[o] = curr_t
``` where the threshold matrix, thres_m, is combined with a local mean filter to generate the cell mask. For example, the mean filter block size may be equal to the selected cell size.

Figure 6:
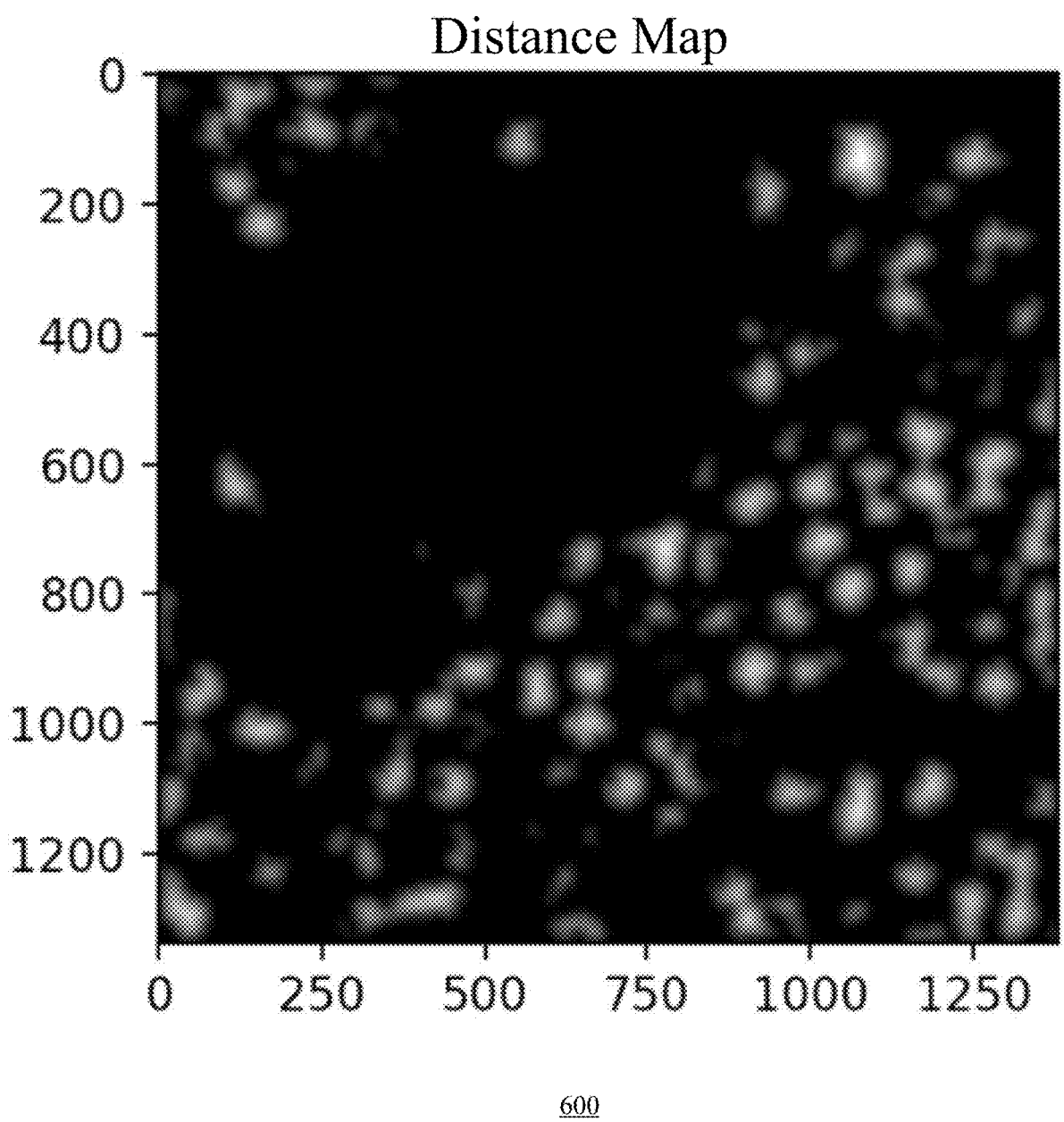
FIG. 6 illustrates a graphical representation of a distance map based on the seed mask in accordance with an embodiment.

At step 310, a chamfer distance transform is applied to the cell mask to generate a distance map, and a maximum height (brightness) marker ("h_maxima") determined on the distance map at step 312 is used to determine cell seeds. FIG. 6 illustrates a graphical representation of a distance map based on the cell mask in accordance with an embodiment. In FIG. 6, for every point within patch 600, the chamfer distance transform assigns a value indicating the distance from that point within the tissue area to a nearest background point. Similarly, for every point in the background, the chamfer distance transform assigns a value indicating a minimum distance from that background point to the nearest point in the tissue area. At step 314, the distance map is gaussian smoothed and the cell seeds are determined in the distance map using the h_maxima marker.

Figure 7:
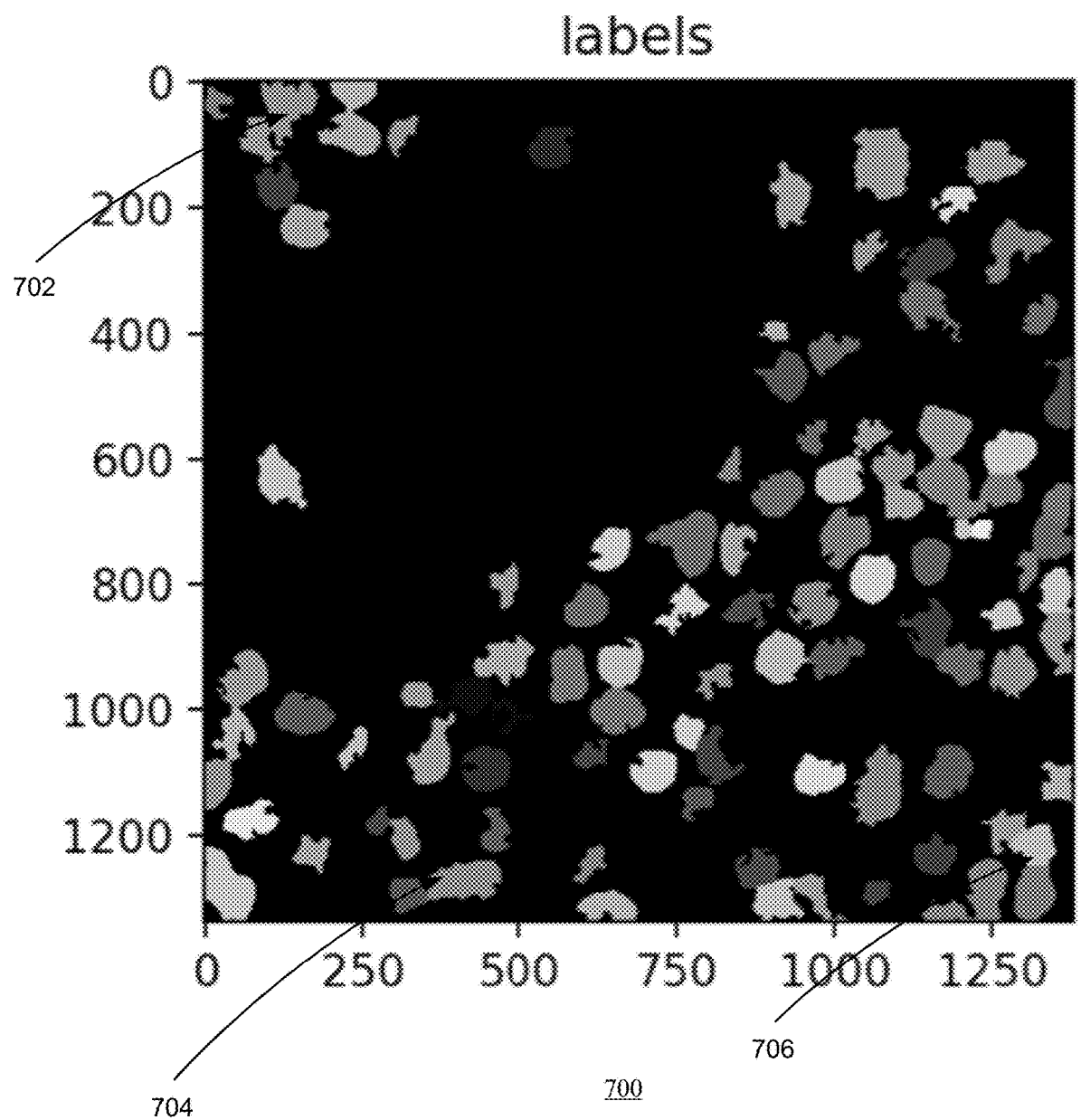
FIG. 7 illustrates a graphical representation of cell segments determined by applying a watershed transformation to the seed mask in accordance with an embodiment.

At step 316, cell segments within the plurality of patches are determined using a watershed transformation with the distance map and cell seeds as input. FIG. 7 illustrates a graphical representation of cell segments determined by using a watershed transformation in accordance with an embodiment. As illustrated in patch 700, cell segments, e.g., segments 702, 704, and 706, are distinguished from background areas such that they may be counted using various computational methods. In some embodiments, small objects may be removed from the plurality of patches after using the watershed transformation.

A whole cell count is then calculated for the plurality of patches based on the cell segments at step 318, and a client device is configured for real-time cell counting based on the whole cell count at step 320.

Figure 8:
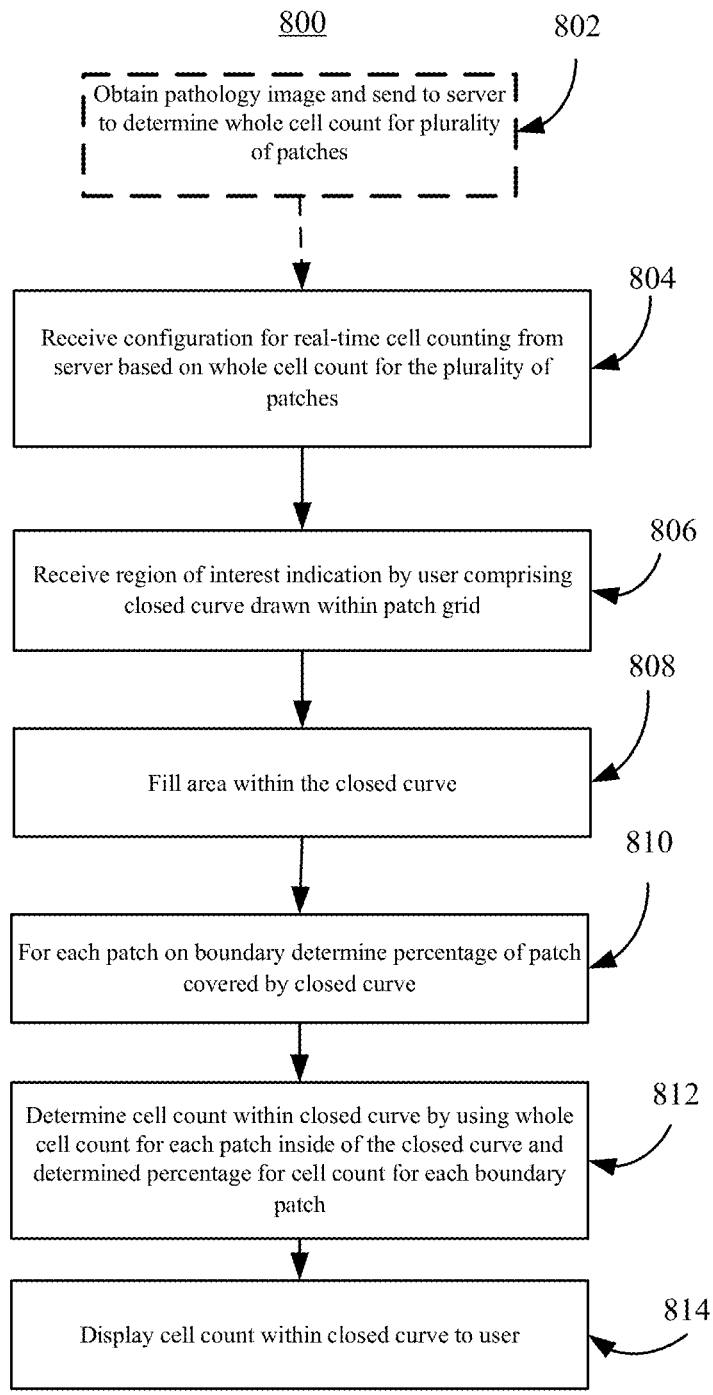
FIG. 8 illustrates a flow diagram of example operations for determining a cell count for a region of interest within a whole slide pathology image in accordance with an embodiment.

FIG. 8 illustrates a flow diagram of example operations for determining a cell count for a region of interest within a whole slide pathology image in accordance with an embodiment. For example, at step 802 client device 210 may obtain a pathology image and send the image to server 220, where cell counting engine 230 may determine a whole cell count for a plurality of patches within the image using one or more of the methods described above.

At step 804, client device 210 may be configured for real-time cell counting based on the whole cell count. At step 806, client device 210 may receive a region of interest selection comprising a closed curve drawn within a patch grid overlay of the whole slide pathology image. For example, the patch grid may comprise a plurality of patches overlaid on the whole slide pathology image.

At step 808, client device 210 is configured to fill an area within the closed curve. For example, a user may select a set of points that form a closed curve (or a circle), via a graphical interface. The client device may then be configured to join the selected points and fill the region enclosed within the joined points to define a closed curve.

At step 810, client device 210 is further configured to determine, for each patch on a boundary of the closed curve, a percentage of the patch covered by the closed curve.

Client device 210 then determines a cell count within the closed curve based on (1) a whole cell count for each patch inside of the closed curve, and (2) the determined percentage for each patch on the boundary of the closed curve at step 812. Client device 210 may be further configured to facilitate a display of the cell count within the closed curve to a user, e.g., via a display device, at step 814.

In some embodiments, an updated region of interest selection related to an updated mouse pointer position within the plurality of patches may be received, and a cell count may be computed for the updated region of interest based on a bi-linear interpolation of a cell count for each patch of the plurality of patches. For example, the cell density may be displayed as a mouse pointer is moved by determining a pixel location of the mouse pointer on the whole slide image, determining a plurality of patches (e.g., four patches) that are adjacent to the mouse pointer pixel location, and computing the cell density at the mouse pointer pixel location using bilinear interpolation. As such, the user may reposition the closed curve within the patch grid and receive an updated real-time cell count calculation for the new closed curve area.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computers and interact via a network. The client-server relationship may be defined and controlled by computer programs running on the respective client and server computers.

Figure 9:
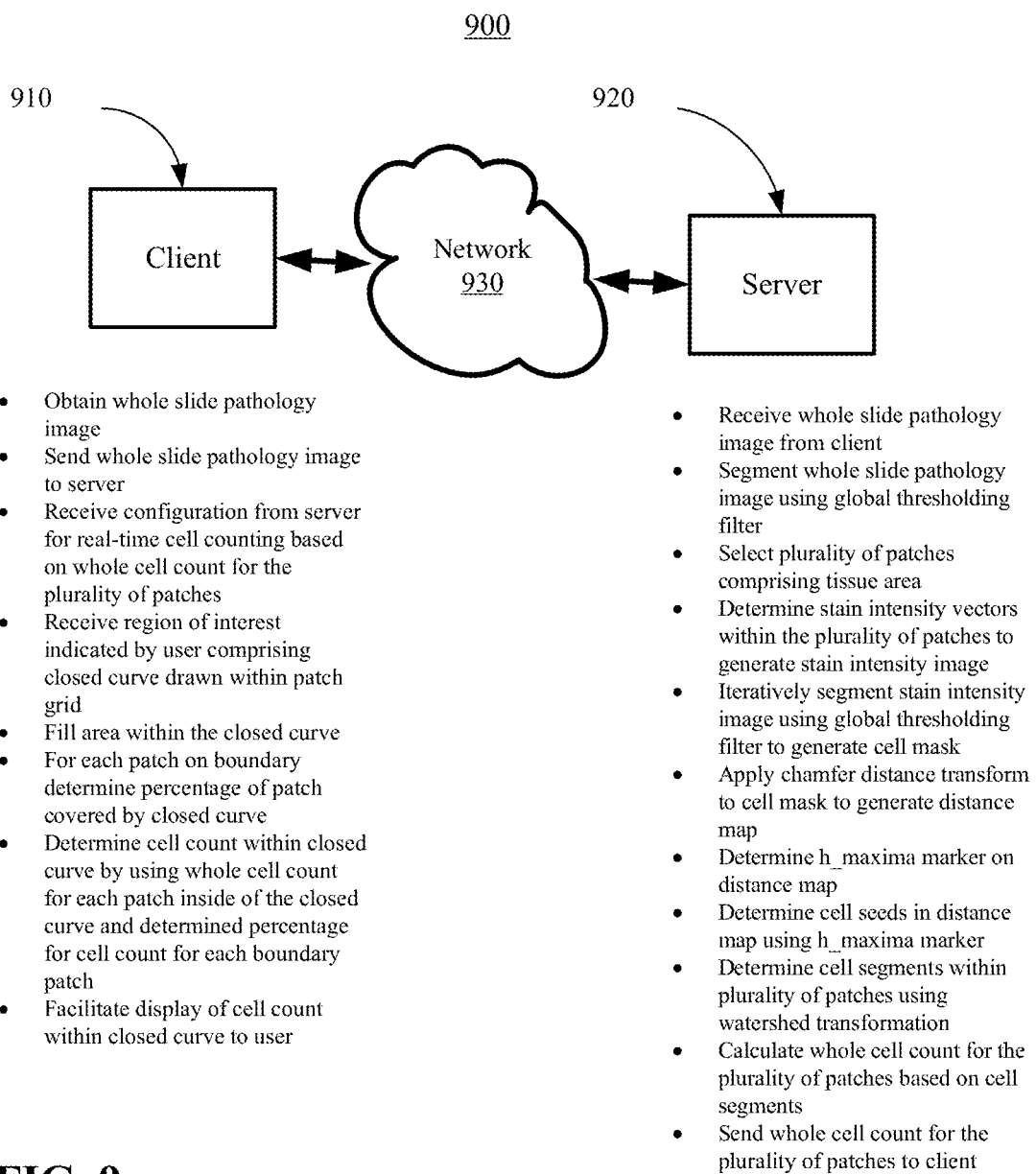
FIG. 9 illustrates a block diagram of an exemplary client-server relationship that can be used for implementing one or more aspects of the various embodiments.

A high-level block diagram of an exemplary client-server relationship that may be used to implement systems, apparatus and methods described herein is illustrated in FIG. 9. Client-server relationship 900 comprises client 910 in communication with server 920 via network 930, and illustrates one possible division of real-time cell counting within a whole slide pathology image between client 910 and server 920. For example, client 910, in accordance with the various embodiments described above, may obtain a whole slide pathology image and send the whole slide pathology image to server 920. Server 920 may, in turn, receive the whole slide pathology image from client 910, segment the whole slide pathology image using a global thresholding filter, select a plurality of patches comprising a tissue area determined from the segmentation, determine stain intensity vectors within the plurality of patches to generate a stain intensity image, iteratively segment the stain intensity image using the global thresholding filter to generate a cell mask, apply a chamfer distance transform to the cell mask to generate a distance map, determine an h_maxima marker on the distance map, determine cell seeds in the distance map using the h_maxima marker, determine cell segments within the plurality of patches using a watershed transformation, calculate a whole cell count for the plurality of patches based on the cell segments, and send the whole cell count for the plurality of patches to client 910. Client 910 may further receive a configuration from server 920 for real-time cell counting based on the whole cell count for the plurality of patches, receive a region of interest indication by a user comprising a closed curve drawn within a patch grid, fill an area within the closed curve, for each patch on the boundary of the closed curve, determine a percentage of the patch covered by the closed curve, determine a cell count within the closed curve by using the whole cell count for each patch inside of the closed curve and the determined percentage for a cell count for each boundary patch, and facilitate display of the cell count within closed curve to the user.

One skilled in the art will appreciate that the exemplary client-server relationship illustrated in FIG. 9 is only one of many client-server relationships that are possible for implementing the systems, apparatus, and methods described herein. As such, the client-server relationship illustrated in FIG. 9 should not, in any way, be construed as limiting. Examples of client devices 910 can include cellular smartphones, kiosks, personal data assistants, tablets, robots, vehicles, web cameras, or other types of computing devices.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 3 and 8, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 10:
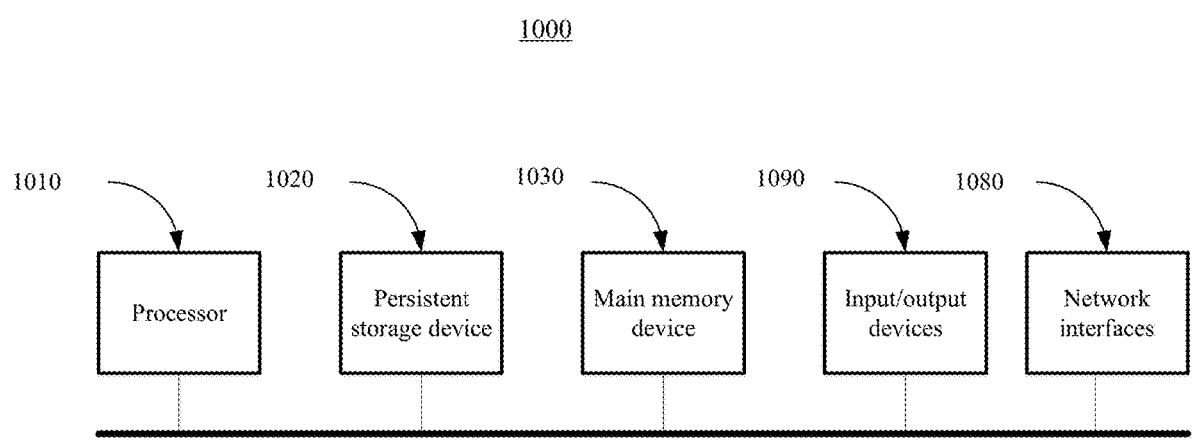
FIG. 10 illustrates a block diagram of a distributed computer system that can be used for implementing one or more aspects of the various embodiments.

A high-level block diagram of an exemplary apparatus that may be used to implement systems, apparatus and methods described herein is illustrated in FIG. 10. Apparatus 1000 comprises a processor 1010 operatively coupled to a persistent storage device 1020 and a main memory device 1030. Processor 1010 controls the overall operation of apparatus 1000 by executing computer program instructions that define such operations. The computer program instructions may be stored in persistent storage device 1020, or other computer-readable medium, and loaded into main memory device 1030 when execution of the computer program instructions is desired. For example, cell counting engine 230 may comprise one or more components of computer 1000. Thus, the method steps of FIGS. 3 and 8 can be defined by the computer program instructions stored in main memory device 1030 and/or persistent storage device 1020 and controlled by processor 1010 executing the computer program instructions. For example, the computer program instructions can be implemented as computer executable code programmed by one skilled in the art to perform an algorithm defined by the method steps of FIGS. 3 and 8. Accordingly, by executing the computer program instructions, the processor 1010 executes an algorithm defined by the method steps of FIGS. 3 and 8. Apparatus 1000 also includes one or more network interfaces 1080 for communicating with other devices via a network. Apparatus 1000 may also include one or more input/output devices 1090 that enable user interaction with apparatus 1000 (e.g., display, keyboard, mouse, speakers, buttons, etc.).

Processor 1010 may include both general and special purpose microprocessors, and may be the sole processor or one of multiple processors of apparatus 1000. Processor 1010 may comprise one or more central processing units (CPUs), and one or more graphics processing units (GPUs), which, for example, may work separately from and/or multi-task with one or more CPUs to accelerate processing, e.g., for various image processing applications described herein. Processor 1010, persistent storage device 1020, and/or main memory device 1030 may include, be supplemented by, or incorporated in, one or more application-specific integrated circuits (ASICs) and/or one or more field programmable gate arrays (FPGAs).

Persistent storage device 1020 and main memory device 1030 each comprise a tangible non-transitory computer readable storage medium. Persistent storage device 1020, and main memory device 1030, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1090 may include peripherals, such as a printer, scanner, display screen, etc. For example, input/output devices 1090 may include a display device such as a cathode ray tube (CRT), plasma or liquid crystal display (LCD) monitor for displaying information (e.g., a DNA accessibility prediction result) to a user, a keyboard, and a pointing device such as a mouse or a trackball by which the user can provide input to apparatus 1000.

Any or all of the systems and apparatuses discussed herein, including cell counting engine 230 may be performed by, and/or incorporated in, an apparatus such as apparatus 1000. Further, apparatus 1000 may utilize one or more neural networks or other deep learning techniques to perform cell counting engine 230 or other systems or apparatuses discussed herein.

One skilled in the art will recognize that an implementation of an actual computer or computer system may have other structures and may contain other components as well, and that FIG. 10 is a high-level representation of some of the components of such a computer for illustrative purposes.

The foregoing specification is to be understood as being in every respect illustrative and exemplary, but not restrictive, and the scope of the invention disclosed herein is not to be determined from the specification, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

We claim:

1. An object-counting computing apparatus comprising:
   at least one computer-readable memory storing object-counting software instructions;
   at least one processor coupled with the at least one computer-readable memory and that operates as an object-counting engine upon execution of the object-counting software instructions to:
   obtain, in the at least one computer-readable memory, a whole image comprising images of objects;
   segment the whole image into image areas based on a global threshold;
   select a plurality of patches associated with the image areas;
   generate an intensity image based on an optical density of each patch of the plurality of patches;
   generate at least one object mask with at least one object seed by segmenting the intensity image based on an iteratively reducing threshold;
   generate a distance map based on at least one transformation of the at least one object mask;
   distinguish object segments within the plurality of patches based on at least one transformation of the distance map and at least one object seed; and
   configure a device to display an object count for at least one patch in the plurality of patches based on counting the object segments.

2. The apparatus of claim 1, wherein the global threshold is based on at least one of an Otsu filter and a Yen filter.

3. The apparatus of claim 2, wherein the global threshold is based on a minimum of the Otsu filter and the Yen filter.

4. The apparatus of claim 1, wherein the iteratively reducing threshold is related to a known object size.

5. The apparatus of claim 4, wherein the known object size is between about 5 microns and about 20 microns.

6. The apparatus of claim 1, wherein the optical density comprises an RGB density.

7. The apparatus of claim 1, wherein the plurality of patches is associated with at least one selected region of interest.

8. The apparatus of claim 7, wherein the object count relates to the at least one selected region of interest.

9. The apparatus of claim 7, wherein the at least one selected region of interest is based on a set of points that form a closed curve in the whole image.

10. The apparatus of claim 9, wherein an object is determined based on a point that forms a closed curve.

11. The apparatus of claim 1, wherein the device is configured to display the object count in real-time.

12. The apparatus of claim 1, wherein the object count comprises a whole object count for the whole image.

13. The apparatus of claim 1, wherein the whole image comprises a whole-slide image.

14. The apparatus of claim 1, wherein at least some the patches of the plurality of patches are selected randomly.

15. The apparatus of claim 1, wherein the distance map indicates a distance to a nearest background point.

16. The apparatus of claim 1, wherein the at least one object seed is determined by gaussian smoothing the distance map.

17. The apparatus of claim 1, wherein the at least one object seed relates to a maximum height marker in the distance map.

18. The apparatus of claim 1, where in the object count comprises an updated object count based a change in a region of interest.

19. A non-transitory, computer-readable medium storing instructions which, when executed by at least one processor and memory, cause the at least one processor to perform operations comprising one or more steps to:
- obtain, in at least one computer-readable memory, a whole image comprising images of objects;
- segment the whole image into image areas based on a global threshold;
- select a plurality of patches associated with the image areas;
- generate an intensity image based on an optical density of each patch of the plurality of patches;
- generate at least one object mask with at least one object seed by segmenting the intensity image based on an iteratively reducing threshold;
- generate a distance map based on at least one transformation of the at least one object mask;
- distinguish object segments within the plurality of patches based on at least one transformation of the distance map and at least one object seed; and
- configure a device to display an object count for at least one patch in the plurality of patches based on counting the cell segments.

20. A computerized method comprising:
- obtaining, in at least one computer-readable memory, a whole image comprising images of objects;
- segmenting the whole image into image areas based on a global threshold;
- selecting a plurality of patches associated with the image areas;
- generating an intensity image based on an optical density of each patch of the plurality of patches;
- generating at least one object mask with at least one object seed by segmenting the intensity image based on an iteratively reducing threshold;
- generating a distance map based on at least one transformation of the at least one object mask;
- distinguishing object segments within the plurality of patches based on at least one transformation of the distance map and at least one object seed; and
- configuring a device to display an object count for at least one patch in the plurality of patches based on counting the object segments.

* * * * *